(12) United States Patent
Labraymi et al.

(10) Patent No.: US 8,814,446 B2
(45) Date of Patent: Aug. 26, 2014

(54) SPLICE PROTECTION DEVICE FOR OPTICAL SPLICES

(75) Inventors: Mohamed Labraymi, Antwerp (BE); Sam Leeman, Kessel-Lo (BE); Kristof Vastmans, Boutersem (BE); Bart Mattie Claessens, Hasselt (BE); Kathleen Bellekens, Winksele Delle (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 263 days.

(21) Appl. No.: 12/658,572

(22) Filed: Feb. 9, 2010

(65) Prior Publication Data

US 2010/0232752 A1     Sep. 16, 2010

(30) Foreign Application Priority Data

Feb. 10, 2009  (EP) ..................... 09001854

(51) Int. Cl.
*G02B 6/255*  (2006.01)

(52) U.S. Cl.
USPC ................ 385/99; 385/95; 385/100; 385/109

(58) Field of Classification Search
None
See application file for complete search history.

(56) References Cited

U.S. PATENT DOCUMENTS

| | | | |
|---|---|---|---|
| 4,978,194 A * | 12/1990 | Allen et al. ..................... 385/76 |
| 5,121,458 A * | 6/1992 | Nilsson et al. ................ 385/100 |
| 5,185,840 A * | 2/1993 | Iapicco ......................... 385/100 |
| 5,210,812 A * | 5/1993 | Nilsson et al. ................ 385/100 |
| 5,224,189 A | 6/1993 | Maas et al. |
| 5,825,963 A * | 10/1998 | Burgett .......................... 385/135 |
| 6,338,579 B1 * | 1/2002 | Winiarski ....................... 385/99 |
| 6,466,725 B2 | 10/2002 | Battey et al. |
| 6,619,697 B2 * | 9/2003 | Griffioen et al. ........... 285/126.1 |
| 7,127,143 B2 * | 10/2006 | Elkins et al. .................. 385/100 |

(Continued)

FOREIGN PATENT DOCUMENTS

| EP | 1 944 886 A | 7/2008 |
|---|---|---|
| GB | 2 192 732 A | 1/1988 |

OTHER PUBLICATIONS

European Search Report issued by the European Patent Office, Rijswijk, Netherlands, dated Jun. 23, 2009, for related Application No. EP 09001854.0; 9 pages.

*Primary Examiner* — Uyen Chau N Le
*Assistant Examiner* — Chad Smith
(74) *Attorney, Agent, or Firm* — Faegre Baker Daniels LLP (57) ABSTRACT

The invention relates to a splice protection device for spliced optical fibers and to a method particularly for providing an access point to an optical fiber cable in a dwelling unit of a multi dwelling unit. To facilitate mounting of a splice protection device, the splice protection device according to the invention comprises a first and a second tube, the second tube being arranged concentrically and slidable within the first tube, the first and second tubes being adapted to receive at least one spliced fiber. The present invention furthermore relates to a method for providing an access point to a provider optical cable in a dwelling unit of a multi-dwelling unit. The inventive method avoids splicing work within the dwelling unit and is characterized by the steps of branching-off at least one branching optical fiber of the provider cable at a branch point adjacent to said dwelling unit, passing a preassembled connector cable being provided with a connector through duct work for cable to the branch point and splicing the branching optical fiber with an optical fiber of the connector cable.

10 Claims, 7 Drawing Sheets

(56) References Cited

U.S. PATENT DOCUMENTS

| | | |
|---|---|---|
| 7,155,093 B2 | 12/2006 | Elkins, II et al. |
| 7,242,841 B2 | 7/2007 | Greenwood et al. |
| 7,266,274 B2 * | 9/2007 | Elkins et al. ............ 385/100 |
| 7,277,614 B2 * | 10/2007 | Cody et al. ............... 385/100 |
| 7,756,372 B2 * | 7/2010 | Mullaney et al. ......... 385/100 |
| 8,041,178 B2 * | 10/2011 | Lu et al. .................... 385/147 |
| 8,126,304 B2 * | 2/2012 | Mullaney et al. ......... 385/100 |
| 2005/0259928 A1 | 11/2005 | Elkins, II |
| 2006/0056782 A1 * | 3/2006 | Elkins et al. ............ 385/100 |
| 2007/0009214 A1 * | 1/2007 | Elkins et al. ............ 385/100 |
| 2007/0196068 A1 * | 8/2007 | Mullaney et al. ......... 385/134 |
| 2008/0019641 A1 | 1/2008 | Elkins, II et al. |
| 2010/0092136 A1 * | 4/2010 | Nhep et al. ................. 385/76 |
| 2012/0020630 A1 * | 1/2012 | Vastmans et al. ........... 385/99 |
| 2012/0177328 A1 * | 7/2012 | Marcouiller et al. ........ 385/99 |

\* cited by examiner

SPLICE PROTECTION DEVICE FOR OPTICAL SPLICES

The invention relates to a splice protection device for spliced optical fibers.

Fiber optic cable is available in many physical variations. There are, for instance, single and multiple fiber constructions, aerial and direct burial cable types. Usually an outer jacket of PA, PVC or similar material is extruded over the cable to protect the inside of the cable from environmental impacts. The fibers can be protected by a loose fitting tube or a tight fitting buffer coating. In the loose tube method the fiber is enclosed in a plastic buffer-tube that is larger in inner diameter than the outer diameter of the fiber itself. Since the fiber is basically free to float within the tube, mechanical forces acting on the outside of the cable do not reach the fiber. For splicing fibers the protecting tubes and jackets must be removed to have a direct access to the fibers. After connecting the fibers by a mechanical or fusion splice the fibers and the splice must be protected to prevent damage by environmental effects or external forces.

US 2007/0009214 A1, U.S. Pat. Nos. 7,127,143 B2, 7,277,614 B2, US 2006/0056782 A1 and U.S. Pat. No. 7,155,093 B2 disclose fiber optic cable assemblies comprising a fiber optic distribution cable having predetermined optical fibers terminated and branched at a cable access point and a tether cable optically connected to the predetermined optical fibers. The cable access point is encapsulated by a flexible over-molded body. To protect the components of said cable access point, an over-molding material blocking wrap or protective layer is added around the distribution or tether cable prior to over-molding.

For protecting the untreated portion of the optical fibers and to provide a guide channel for the optical fibers to the tether, the assemblies described in the US 2007/0009214 A1, US 2006/0056782 A1 and U.S. Pat. No. 7,155,093 B2 have flexible tubings, routing the optical fibers of the tether, optically connected to the optical fibers of the distribution cable, out of the over-molded body.

U.S. Pat. No. 7,242,841 B2 discloses a flexible cross-connect apparatus for cross-connecting fiber optic cables. To provide for a preferential bending plane, the cross-connect apparatus includes a transition string member formed from a flexible material that is shaped so that it has a preferential bend characteristic. The fiber optic cable jackets are connected to the opposing ends of the transition string member by cable clamp assemblies.

To reduce furcation assemblies in price, U.S. Pat. No. 7,266,274 B2 and US 2008/0019641 A1 disclose a pre-connectorized fiber optic distribution cable assembly which includes a mid-span access location along the length of a distribution cable. The mid-span access location, the accessed, terminated and connectorized optical fiber, the optical fiber and at least a portion of the receptacle are encapsulated by a protective over-molded shell.

U.S. Pat. No. 5,210,812 shows a housing for mounting at a branch point of a distribution cable for protecting the optical fibers and splices from damage. The housing forms an enclosure for the splices which are held in place mechanically by rows of pins.

Further housings for protecting optical fiber splices are described in U.S. Pat. Nos. 6,466,725 B2 and 6,619,697 B2. The housings consist of two parts which are connected to each other by an integral hinge. The substantially Y-shaped housings consist of a main body for receiving a distribution cable and a branched portion for receiving the splice and one or several connecting cables.

Splice protection devices for protecting optical splices are, for example, used in multiple dwelling units which receive outside service provider cables from a provider. These outside service provider cables are coupled with cables feeding individual dwelling units within the multiple dwelling unit. The cables are typically housed within a riser shaft within the multiple dwelling unit. That shaft typically is a riser shaft, i.e. extends in vertical direction and houses a number of services including the optical network intended to distribute signals to each individual dwelling unit within the multiple dwelling unit. Due to the high number of cables and tubes which are arranged within the riser shaft the space for mounting optical fiber splices within the riser shaft is mostly very small. Hence, connecting a connection cable to the provider cable and mounting splice protection devices for protecting the optical splices is made difficult. Further, electrical or plumbing installation may render this shaft a severe environment for optical cables.

Hence, a problem to be solved is to provide a splice protection device for optical fiber splices which requires less space and which is easy to mount.

This problem is solved for the splice protection device mentioned above according to the invention by a first and a second tube, the second tube being arranged at least partially, concentrically and slidable in the first tube.

The splice protection device allows for adapting its length by telescopically moving its tubes. The splice protection device of the present invention is in particular useful for splicing individual optical fibers of an optical cable. For mechanical or fusion splicing, both optical fibers to be spliced have to be exposed, i.e. any jacket surrounding the optical fiber needs to be moved for a certain length of each of the fibers. Such overlength has to be covered and shielded from the environment after splicing. It is known in prior art to form a loop of this overlength and store the loop in a housing likewise receiving the splice. With the present invention, however, such bulky housing can be avoided. The entire overlength can be exposed by sliding the telescopic tubes into each other. After splicing, the tubes may be extended and form a protective cover for the overlength of a branching fiber and/or a connecting fiber.

While it is preferred to use the inventive splice protection device for shielding single optical fibers which are to be spliced, such preferred use being best adaptable with a second tube, which forms the smaller opposed tubes, having an inner diameter which is restricted to receive only one optical fiber, the tubes may have larger inner diameters to receive multiple fibers or even fibers each or plural of them being surrounded by a jacket.

For protecting a splice of two optical fibers, usually two sets of first and second tubes, both of said sets may comprise further tubes, are employed. At least one of said sets comprises a holder which is connected to one of the first or the second tube and is adapted to receive the splice. A splice according to the following description is to be understood as an element which surrounds both terminal ends of the two fibers to be spliced, such element may protect the terminal ends in case of fusion splicing (fusion splice) and/or effect the connection of both fibers by mechanically holding both fibers at the terminal ends (mechanical splice). Both of the splice protecting devices are mounted on the respective fibers, i.e. the fibers are passed through the first and the second tubes and—where present—the holder. The tubes of both splice protection devices are telescopically slid over each other, thereby exposing the overlength. After splicing the tubes of both splice protection devices are expanded and joined with each other at the splice, preferably receiving the splice within a holder. This holder preferably is adapted to tightly surround the splice.

The holder preferably surrounds the splice and connects with the at least one tube with a torpedo-like configuration adding only as much thickness in radial direction to the splice as required for holding and covering the splice and to form a connection between the tubes of the two splice protection devices sufficiently reliable. In the subject configuration, the holder preferably has conical end faces for allowing e.g. introduction of the holder into duct work for cable. The holder which tightly surrounds the splice may allow some degree of movement of the splice within the holder. The holder will, however, form a form closure for the splice, i.e. constitute an abutment shape which will co-operate with the splice to hold the same within the splice holder. The play between the splice and the walls of the housing defining a chamber for receiving the splice may be a radial and/or an axial play. With those dimensional provisions, the two splice protection devices and the holder can be considered as a fairly tight jacket around the overlength of both fibers.

In a preferred embodiment the housing comprises a first part and a second part. Both parts can be connected to separate tubes. The second part is preferably connected to the first or the second tube while the first part is connected to a further tube which will likewise be concentrically arranged and slidable with respect to a still further tube. The further tube and the still further tube may be identical with the first tube and the second tube, respectively. Both of the first part and the second part of the housing are in a pre-mounted position, in which those parts are not connected with each other, slidable with respect to each other in a fiber direction, i.e. in the direction of extension of the fibers to be connected. The first and the second part of the housing are preferably adapted to be directly connected with each other. The parts are preferably formed complementarily such that joining of both parts of the housing will lead to a closure for the splice, which closure is sufficiently rigid for a reliable connection of both parts with each other.

The splice holder as set out in the claims is per se regarded to constitute an invention independent of the splice protection device as defined in claim 1. Instead of tubes being connected to the splice holder on both of its ends, the same may only provide openings adapted to constitute a port for the fiber. This port is preferably such, that either a fiber or a tube tightly surrounding the fiber can be connected to and/or passed into the housing of the splice holder.

Preferably, the first and the second parts of the housing are adapted to be connected to each other by form fit means, such form fit means holding the first and second part against each other in an interlocking manner. Preferably, both parts can be connected by simply snapping against each other. The first and second part of the housing in particular form a meshing configuration, the teeth thereof forming flanks extending a direction perpendicular to the fiber direction and forming abutment faces of the two housing parts to lock the same against each other in this fiber direction. Preferably, in the mounted position, in which both parts are connected with each other and form the housing, those first and second parts are adapted to hold the splice by a form closure. The splice is not only received in a closure which allows not more than minimum radial movement of the splice within the housing, but also positions the splice in the fiber direction in a tight manner.

Preferred embodiments of the housing made of two housing parts are defined in dependent claims.

The inventive splice protection device is in particular suitable for use in a fiber optic cable assembly with a tap-off device having a seating portion for a provider cable and at least one fiber outlet port for a branching optical fiber. This tap-off device is used to be connected to the jacket of an optical cable usually comprising plural optical fibers, of which one is separated and branched off for providing access to the optical cable. The cable is secured to the tap-off device in the seating portion. The fiber optic cable assembly is adapted to be connected to a splice protection device of the invention. For this, the fiber optic cable assembly comprises a connector sleeve which is adapted to be plugged onto the fiber port and is connected to one of said first and second tubes while the other of said first and second tubes is connected to the splice holder. With such fiber optical cable assembly, the branching optical fiber can easily be branched off from the cable and passed out of the tap-off device in a predetermined manner. The branching optical cable can then be fed through the first and second tubes which are connected to the tap-off device thereafter by plugging the connector sleeve onto the selected fiber outlet. The fiber outlet may preferably have a conical design while the connector sleeve has a conical opening facilitating alignment and positioning of the connector sleeve onto the outlet port. Both, the connector sleeve and the fiber outlet port preferably have cooperating snapping surfaces for proper connection of the two.

In a preferred embodiment, the fiber outlet port has a cone with a ring segmented cross-section. With this preferred embodiment, the cone adapted to be inserted into the connector sleeve is not circumferentially closed. Thus, a channel provided within the outlet port is accessible in circumferential direction of the cone for inserting a branching optical fiber removed from the optical cable. Accordingly, the branching optical fiber can easily be pulled out from the jacket surrounding all optical fibers of the optical cable and inserted the branching into the port by introduction into the channel in radial direction thereof. This makes insertion of the entire overlength of the branching optical fiber in axial direction of the channel dispensable. Further, the respective design facilitates the production of the tap-off device by plastic injection molding.

To elongate the useable length of the splice protection device or to shorten the shortest possible length of the splice protection device, the splice protection device can comprise more than two tubes.

To connect the protections device mechanically to the provider cable or to prevent dirt or moisture from entering the splice protection device, a tube arranged at an end of the splice protection device can be adapted to receive an end portion of the provider cable or to be received by the end portion of the provider cable. Correspondingly, a tube arranged at an end of the protecting device can be adapted to receive at least an end portion of the connector cable or to be received by the end portion of the connector cable.

The splice protection device may be used for assembling splices in a multi dwelling unit within a cable shaft to build up a connecting to a provider cable. With a provider cable provided in a central supply shaft of a multiple dwelling unit, at least one branching optical fiber is branched off from this provider cable at a branch point of the provider cable. Therefore a branch point is chosen which is positioned adjacent to said dwelling unit. A connector cable for connecting a floor or a flat is passed through duct work for cable within the multi dwelling unit to the branch point. Aramid or Kevlar™ strands of the connector cable can be used to mechanically connect a tool, for example, a pulling wire, to pull the connector cable through duct work. Then, the free end of the connector cable is spliced with the branched off cable to provide access of the dwelling unit to the provider cable.

Such method may preferably be conducted with the splice protection device of the present invention. In such a case the connecting fiber of the connector cable is inserted into two tubes. One tube is slid telescopically into the other tube. After splicing the connecting fiber to the branching optical fiber the two tubes are extended telescopically, thereby protecting the overlength of one or both fibers.

The invention will be described hereinafter in greater detail and in an exemplary manner using advantageous embodiments of the invention and with reference to the drawings. The described embodiments are only possible configurations in which, however, the individual features as described above can be provided independently of one another or can be omitted. In the drawings.

Firstly, the construction of a splice protection device 1 configured according to the invention will be described with reference to FIG. 1, which shows a schematic sectional view of a splice protection device 1.

The splice protection device 1 is arranged between a wider cable 2 and a connector cable 3. The provider cable 2 comprises a branching optical fiber 4, the connector cable 3 has a connecting optical fiber 5. To protect the optical fibers 4, 5, the provider 2 and the connector cable 3 are provided with tube shaped cable jackets 6, 7.

To make the branching optical fiber 4 accessible for mounting a splice with the connecting optical fiber 5, a portion of the cable jacket 6 at the end of the provider cable 2 has been removed. Correspondingly, also a portion of the connector cable jacket 7 at the end of the connector cable 3 has been removed. At an end portion 2a of the provider cable 2 the branching optical fiber 4 extends out of the cable jacket 6 and abuts the connecting optical fiber 5, which extends out of an end portion 3a of the connector cable 3. The abutting ends of the branching optical fiber 4 and the connecting optical fiber 5 are connected by a splice 8. The splice 8 is received by the tube 10, which forms a housing for the splice 8. The one or more branching optical fibers 4 and the one or more connecting optical fibers 5 may be spliced together in any conventional manner, such as by fusion or mechanical splicing, either individually or in mass.

The splice protection device 1 comprises a first tube 9 and a second tube 10, the second tube 10 arranged concentrically and slidable in the first tube 9. To fix the first tube 9 to the provider cable 2, an end 9a of the first tube 9 may be moved into an end 6a. The cable jacket 6 and the first tube 9 may also be connected to each other by a forced closure e.g. by gluing or a shrink tube. An end 7a of the cable jacket 7 of the connector cable 3 extends into the second tube 10 and can be connected to the second tube 10 by a form closure.

Figure 1:
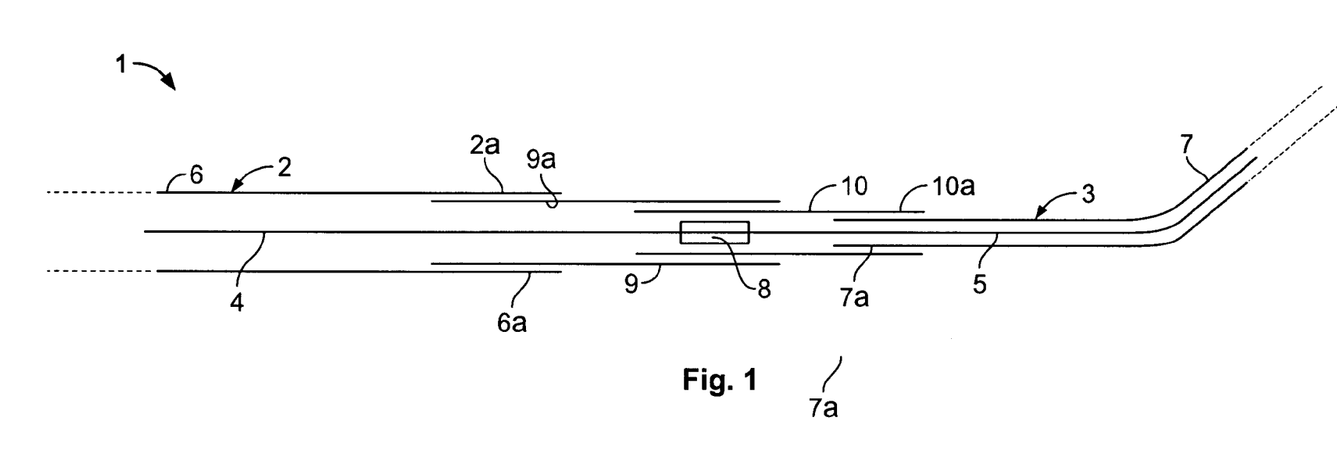
FIG. 1 is a schematic view of a splice protection device.

In the embodiment of FIG. 1, the overlength, i.e. the length of the connecting optical fiber 5 projecting the jacket 7 of the connector cable 3 and the length of the branching optical fiber 4 projecting the jacket 6 of that cable are appropriately selected to effect splicing. Before splicing, the overlength of the branching optical fiber 4 is introduced into the first tube 9 while the overlength of the connecting optical fiber 5 is introduced into the second tube 10. The first tube 9 is pushed into the cable jacket 6 thereby exposing the entire overlength of the branching optical fiber 4. The second tube 10 is telescopically slid over the cable jacket 7 thereby exposing the overlength of the connecting optical fiber 5. After splicing, both tubes 9, 10 are moved towards each other. The second tube 10 is inserted into the first tube 9.

Thus, the splice protection device 1 replaces the function of the cable jackets 6, 7 at the splice 8 and where the cable jacket 6, 7 have been removed. It prevents damage by moisture or from pollution or bending the optical fibers 4, 5.

Figure 2:
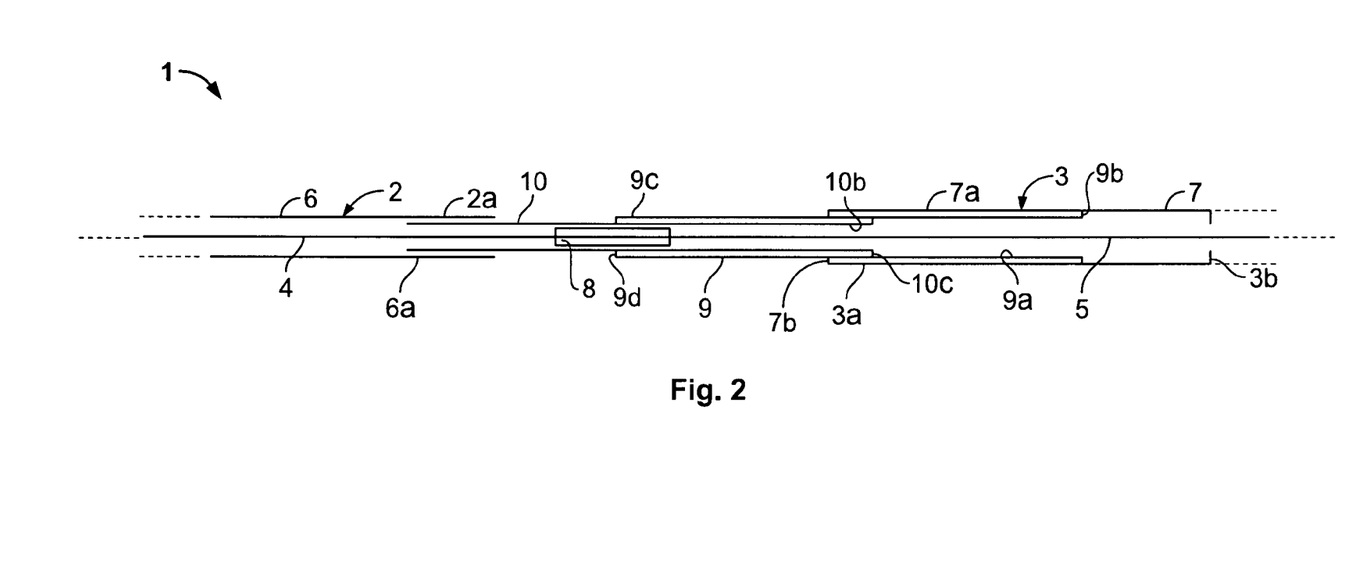
FIG. 2 is a schematic sectional view of a second embodiment of a splice protection device.

FIG. 2 shows a second embodiment of the present invention. Since most of the details illustrated therein are identical to the first embodiment, only the differences thereto will be described in more detail.

The connector cable 3 can be provided with a precast receive for the splice protection device 1. To avoid loss of the splice protection device 1, the cable jacket 7 is at an end portion 3a of the connector cable 3 provided with a stop 7b formed by an offset reducing the inner diameter of the cable jacket 7 at the end 7a. The first tube 9 is provided with a corresponding stop 9b, the stop 9b extending in radial direction and increasing the outer diameter of the end 9a of the first tube 9. At a second end 9c of the first tube 9 opposing to the end 9b the first tube 9 has a second stop 9d which reduces the inner diameter of the first tube at the second end 9c. The second stop 9d is adapted to interfere with a stop 10c positioned at a second end 10b.

To prevent the splice protection device 1 from moving too far into the cable jacket 7, the connector cable 3 can be provided with inner stops 3b adapted to interfere with the stops 9b when the splice protection device 1 is moved into the cable jacket 7.

Figure 3:
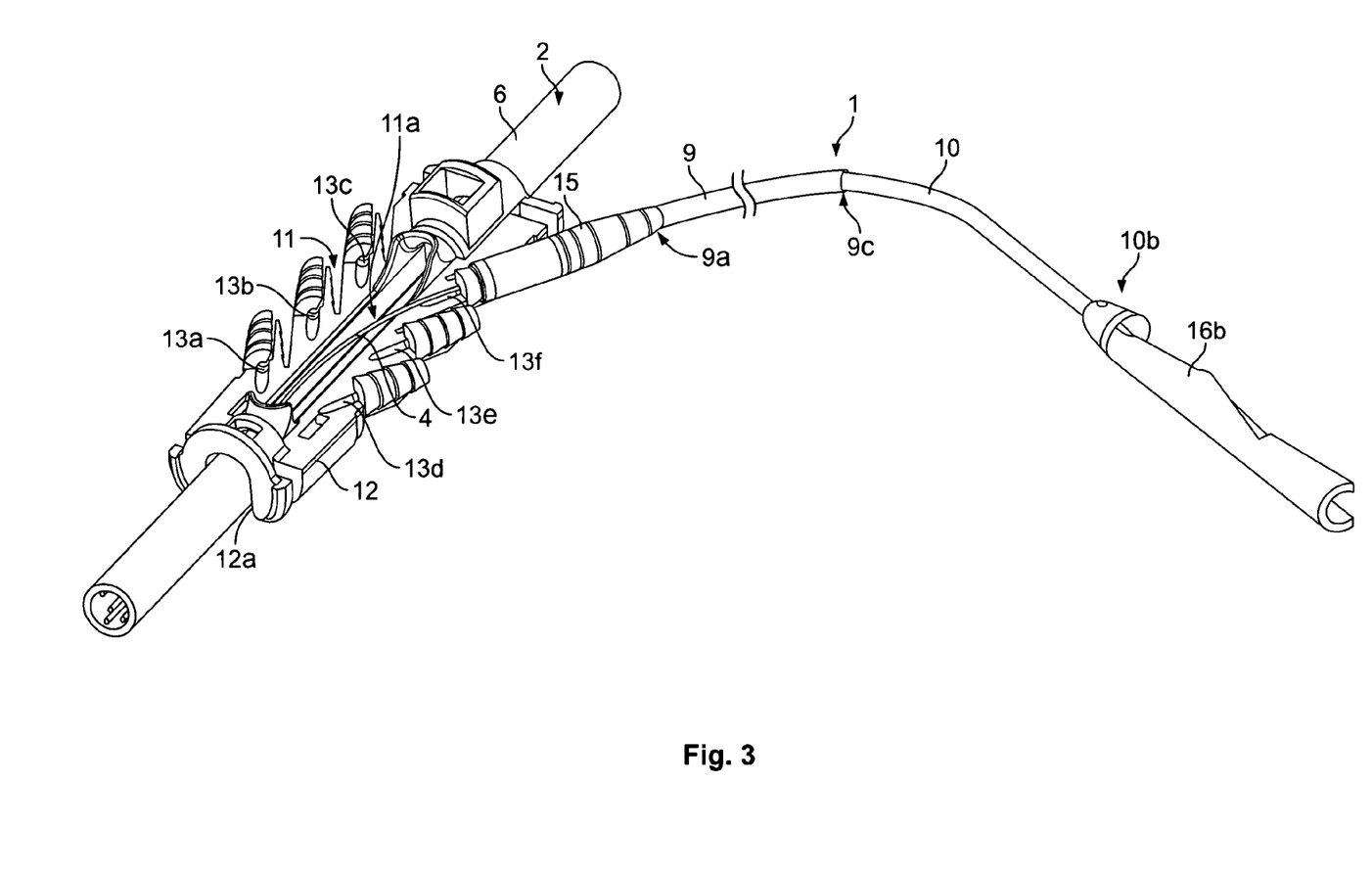
FIG. 3 is a schematic perspective view of a third splice protection device.
Figure 3A:
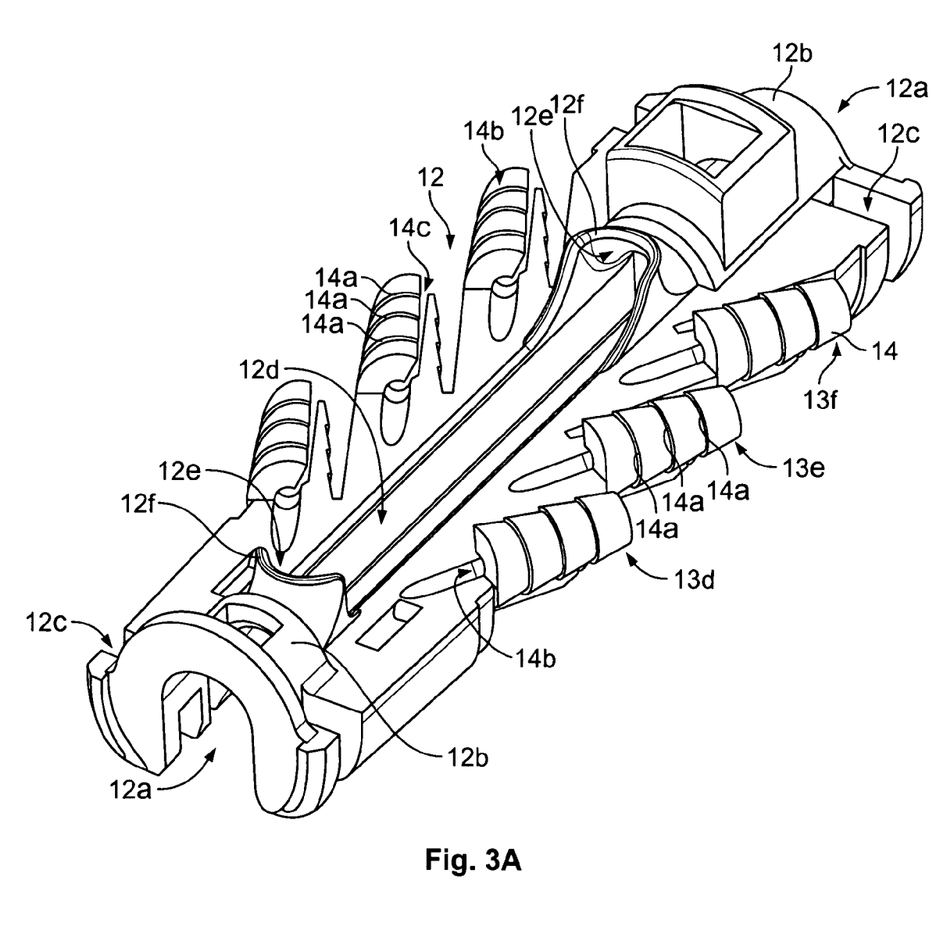
FIG. 3a is an enlarged view of the tap-off device shown in FIG. 3.

FIGS. 3 and 3a show a third embodiment of the present invention, and the same reference numerals have been used. FIG. 3 shows a fiber optic cable assembly provided with a protection device 1. At a branch point 11 of the provider cable 2 a window cut is made in the cable jacket 6 to expose the fibers and fiber bundles enclosed therein. The window 11a created by the removal of a portion of the cable jacket 6 or of the outer casing of the provider cable 2 is the location of a tap off. A tap-off device 12 is arranged at the branch point 11. The provider cable 2 is received by a substantially channel shaped seating portion 12a of the tap-off device 12 (of FIG. 3a).

The seating portion 12a is provided by a shell 12b which circumferentially abuts against the cable jacket 6 of the provider cable 2. Those shells 12b are provided at the longitudinal ends of the tap-off device 12. There, the tap-off device 12 has receiving groves 12c for receiving a cable binder partially surrounding the outer circumference of the shell 12b and partially surrounding the circumference of the cable jacket 6 thereby connecting the tap-off device 12 to the provider cable 2. Between both shells 12b, the tap-off device 12 provides a longitudinal recess 12d adapted to be aligned with the window 11a of the cable jacket 6 and thus, exposing the optical fibers of the provider cable 2 at the branching point 11. In longitudinal direction i.e. running direction of the provider cable 2, this longitudinal recess 12d is terminated by a bent section 12e, each of them providing a slight curvature forming a transition between a guiding face of the tap-off device 12 extending essentially parallel to the provider cable 2 to an end face of the longitudinal recess 12d extending obliged to this longitudinal direction, the latter surface terminating in a rounded rim 12f. The specific design of the bent section 12c and the rounded rim 12f is to assist pulling out performance for pulling of a selected branching optical fiber at the branching point 11 out of the provider cable 12.

The tap-off device 12 includes six fiber outlet ports 13a, 13b, 13c, 13d, 13,e, 13f for guiding branching optical fibers 4 out of the tap off device 12. The fiber outlet ports 13a-f, are provided with a cone 14 with a stepped outer circumference providing holding rims 14a extending essentially in a radial direction of a channel 14b recessed in each fiber outlet port 13. As evident from FIG. 3a, the cone 14 is recessed for its entire length over about 40 to 70° in circumferential direction thereby providing a lateral recess 14c which allows radial insertion of a branching optical fiber 4 into the channel 14b.

As evident from FIG. 3, the splice protection device is provided with an adaptor sleeve 15 for connecting the splice protection device 1 to the fiber outlet port 13f and thus to the tap-off device 12. This adaptor sleeve 15 is adapted to receive the cone 14 and is provided with counter surfaces for the securing rims 14a to provide a snapping connection, through which the protection device 1 is easily connected to the tap-off device 12 but which can be released in case of need. One end of the first tube 9a is connected to the adapter sleeve 15. The other end 9c receives the second tube 10 of smaller diameter. The second end 10b of this second tube is secured to a housing part 16a which will be described hereinafter by referring to FIGS. 4 and 5 in further detail.

Figure 4:
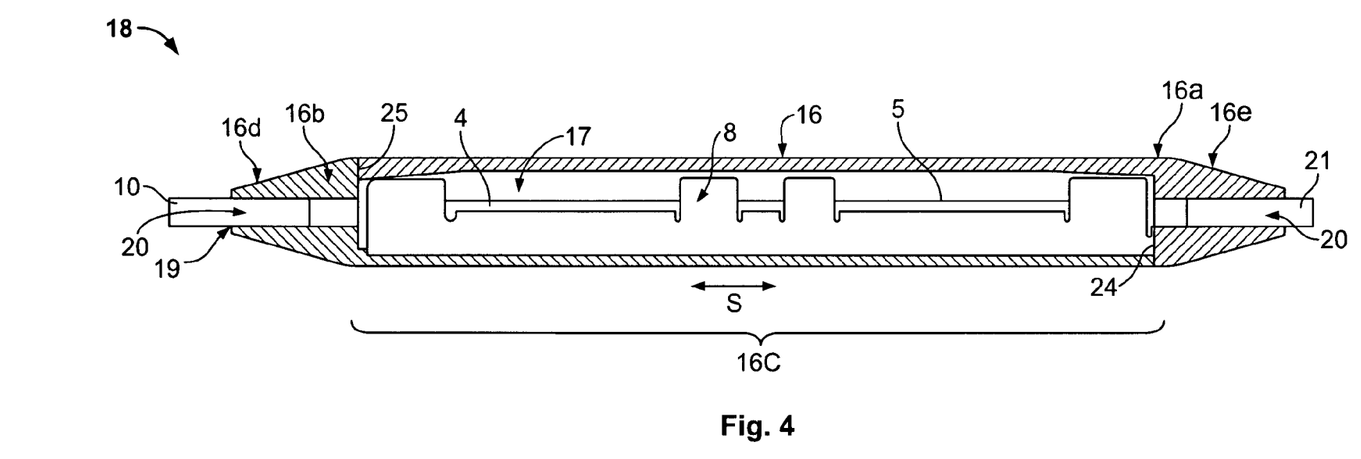
FIG. 4 is a schematic sectional view of an assembled splice holder of the embodiment shown in FIG. 3.

FIG. 4 is a schematic sectional view of the housing 16 constituting the splice holder 18. The housing 16 encloses a chamber 17 for accommodating the splice 8. The housing 16 is formed like a torpedo and tightly sealing the splice 8. The chamber 17 is surrounded by a fairly thin wall of a central section 16c with a cylindrical outer surface. This central section 16c circumferentially surrounds the splice 8. The housing 16 furthermore has terminal sections 16d, 16e each of them holding a tube. The terminal section 16d is connected to the second tube 10 while the terminal section 16e is connected with a further tube 21. The terminal sections 16d, 16e are each formed as truncated cones, the larger diameter thereof merging into the outer circumferential surface of the central section 16c while the smaller diameter end provides a opening 19 of a central tube duct 20 leading to the chamber 17 and being provided with an inner diameter slightly larger than the outer diameter of the assigned tube 10, 21. The terminal sections 16d,e provide for an inner end face 24, 25 limiting the chamber 17 in longitudinal direction of the tubes 10, 12 and providing an abutment for the splice 8 within said chamber.

Figure 5:
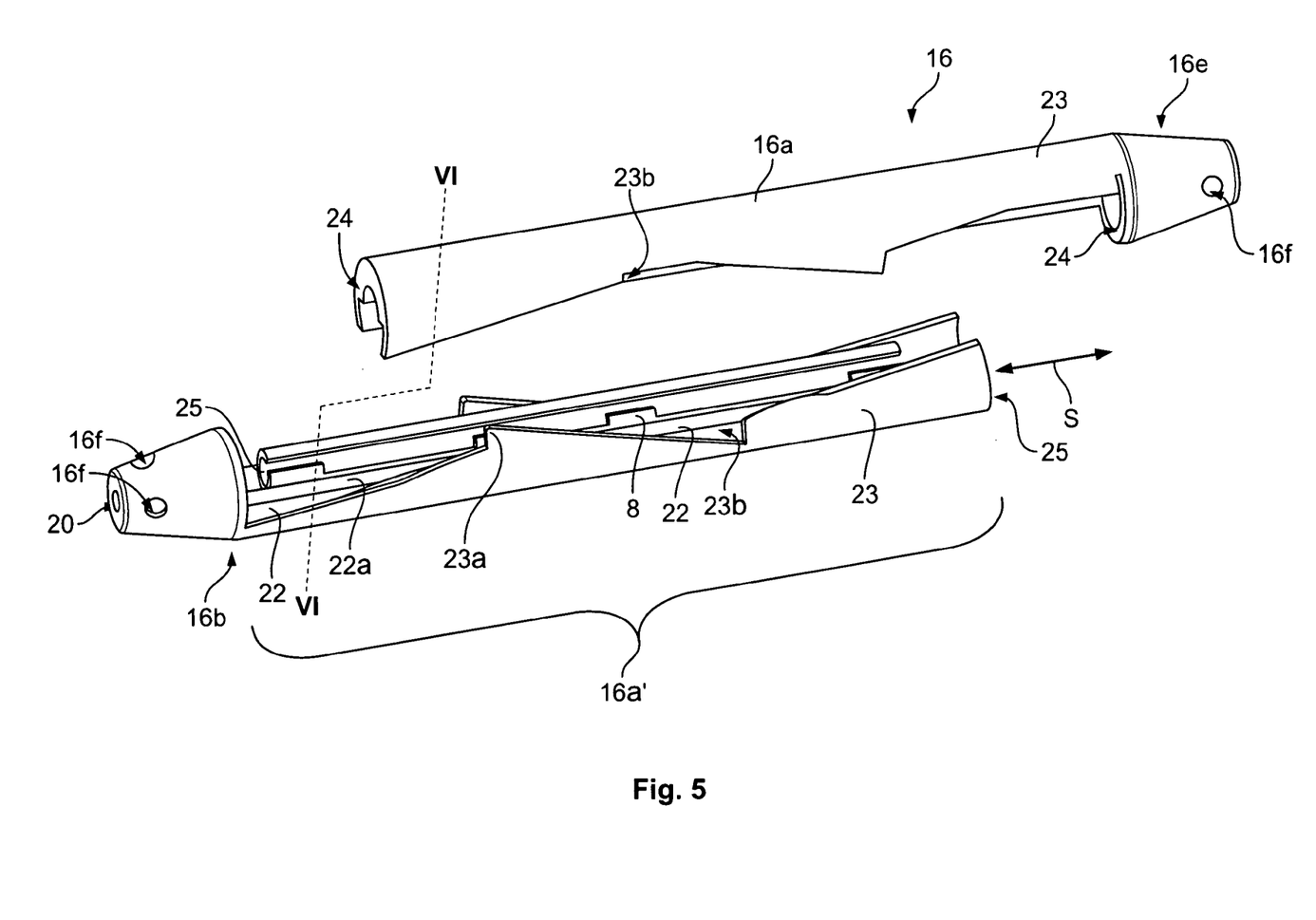
FIG. 5 is a schematic perspective view of a splice holder of FIG. 4.
Figure 5A:
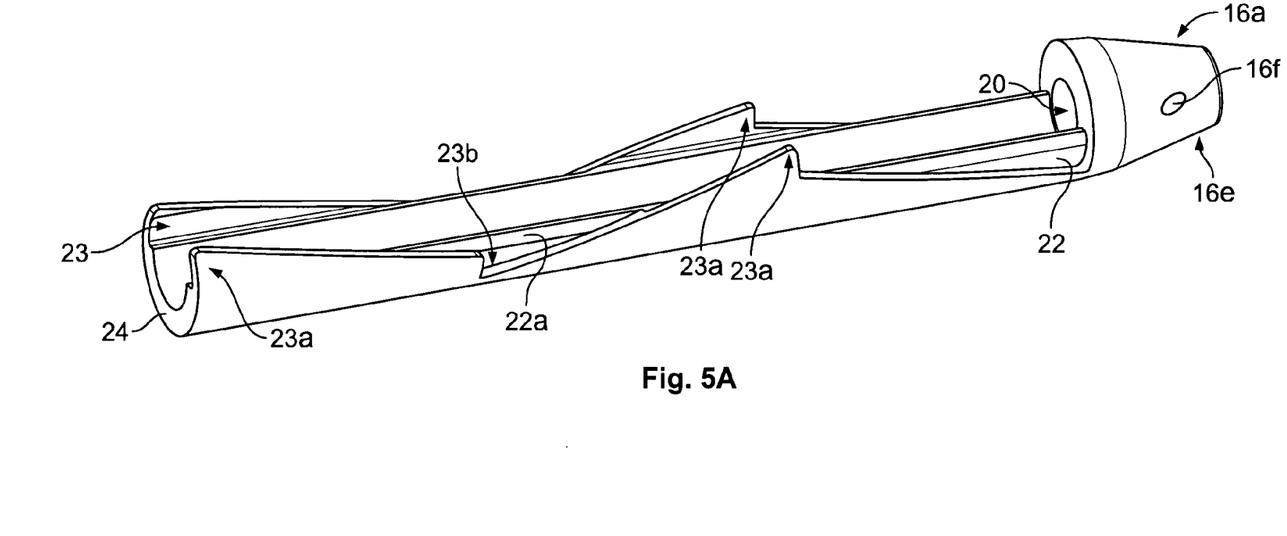
FIG. 5a is a schematic perspective view of a part of the splice holder of FIG. 5

FIG. 5 is an exploded view of a splice holder 18 and elucidates the composition of the housing 16 of two parts, i.e. the first part 16a and the second part 16b. The housing 16 is made of elastically deformable material, for example, plastics. Both parts 16a, 16b are identical such, that the respective parts can be made in the same injection moulding mould.

Figure 6:
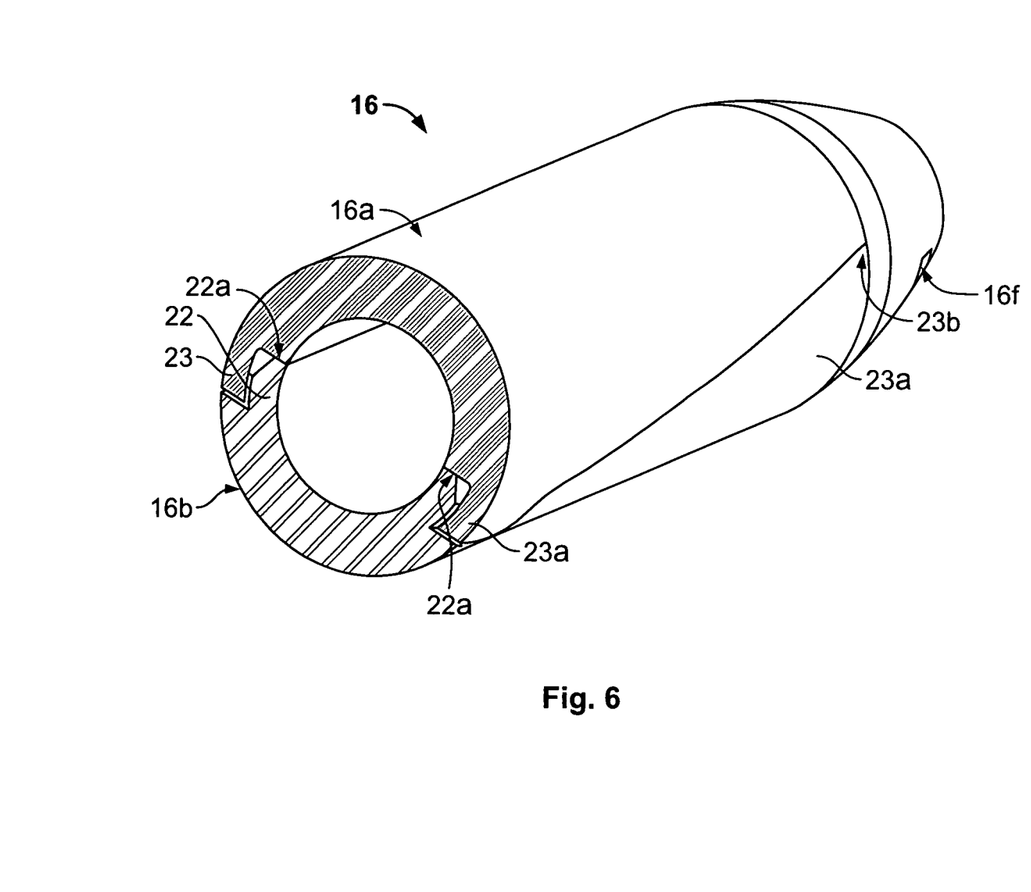
FIG. 6 is a perspective sectional view along the line VI-VI in FIG. 5.

In the central section 16c, each part 16a, 16b has a semi-circular core section 22. In the assembled state (compare FIG. 6) both core sections 22 contact each other with a contacting surface 22a extending in longitudinal direction of the housing 16 and in a plane containing the central axis of the cylindrical central section 16c. Over the entire length of the cylindrical central section 16c, said core section 22 is partially projected and partially exposed by a partial cylindrical shell 23. This shell is a partial cylindrical shell 23 as it does not extend over the entire circumference of the housing 16. At locations where the core section 22 is exposed, the partial cylindrical shell of the assigned part 16a, 16b has an extension of less than 180°, while the extension is a portion where the core section 22 is projected by the partial cylindrical shell 23, said cylindrical shell 23 extends over an angle of more than 180°. The smallest extension of the cylindrical shell 23 is approximately 140° while the maximum extension is approximately 220°. Such maximum extension is provided by teeth-like projections 23a of the semi-cylindrical shell 23 being assigned to complementarily formed tooth-shaped recesses 23b exposing the core section 22 of the other of said parts 16a, 16b. Due to this specific design of each of the parts 16a, 16b, the same can be snapped against each other by connecting the two parts 16a, 16b in radial direction. Such snapping will provide interlocking of the two housing parts 16a, 16b, in radial direction. Further, due to co-operation of the tooth-shaped projection 23a with the tooth-shaped recesses 23b, both shapes being complementary to each other, there is an interlocking between the two parts 16a, 16b which provides form fit in longitudinal direction of the fiber, i.e. the tubes 10, 21.

Both terminal 16d,e of the parts 16a, 16b have radially extending openings 16f which are aligned towards the circumference the assigned tube 10, 21 for fixing the same by means of a screw or by inserting glue through those openings 16.

For assembling the splice protection device of FIGS. 3 to 6, the optical fiber which forms the branching optical fiber 4 is introduced in radial direction into the cones 14 through channel 14b. The fiber is then passed through the adaptor sleeve 15 and through the first and the second tubes 9, 10, the latter being preassembled with the assigned housing part 16b. As a result, the branching optical fiber 4 passes through second part 16b of the housing 16. In the same way, the connecting optical fiber 5 is passed through tubes telescopically arranged with respect to the further tube 21 and into the first part 16a of the housing 16. The telescopic arrangement of tubes is maximally reduced in longitudinal extension of the respective fiber. Then, splicing is effected. Then, the telescopic arrangement of respective tubes is expanded. Both parts 16a, 16b of the housing are positioned next to each other such, that the connecting surfaces 22a of the core section 22 of both parts 16a, 16b are facing each other. Then, the two parts 16a, 16b are snapped secure to each other by snapping the tooth-like projections 23a into the tooth-shaped recesses 23b. After connecting the two parts 16, 16b and thus completing the housing 16, the housing parts 16a, 16b may be unreleasably connected e.g. by a tape, cable binders or a shrink sleeve.

As a result, the overlength of fiber used for splicing is stored within the telescopic tubing. This telescopic tubing is of fairly soft material. Accordingly, the spliced overlength may be arranged in a loop also comprising the housing 16 and stored within a central shaft of a building in a compact and protected manner. It is even thinkable to insert parts of the splicing overlength including the housing into duct work for cable within a building as the housing 16 can be made fairly small in diameter and thus pass through such duct work.

Figure 7:
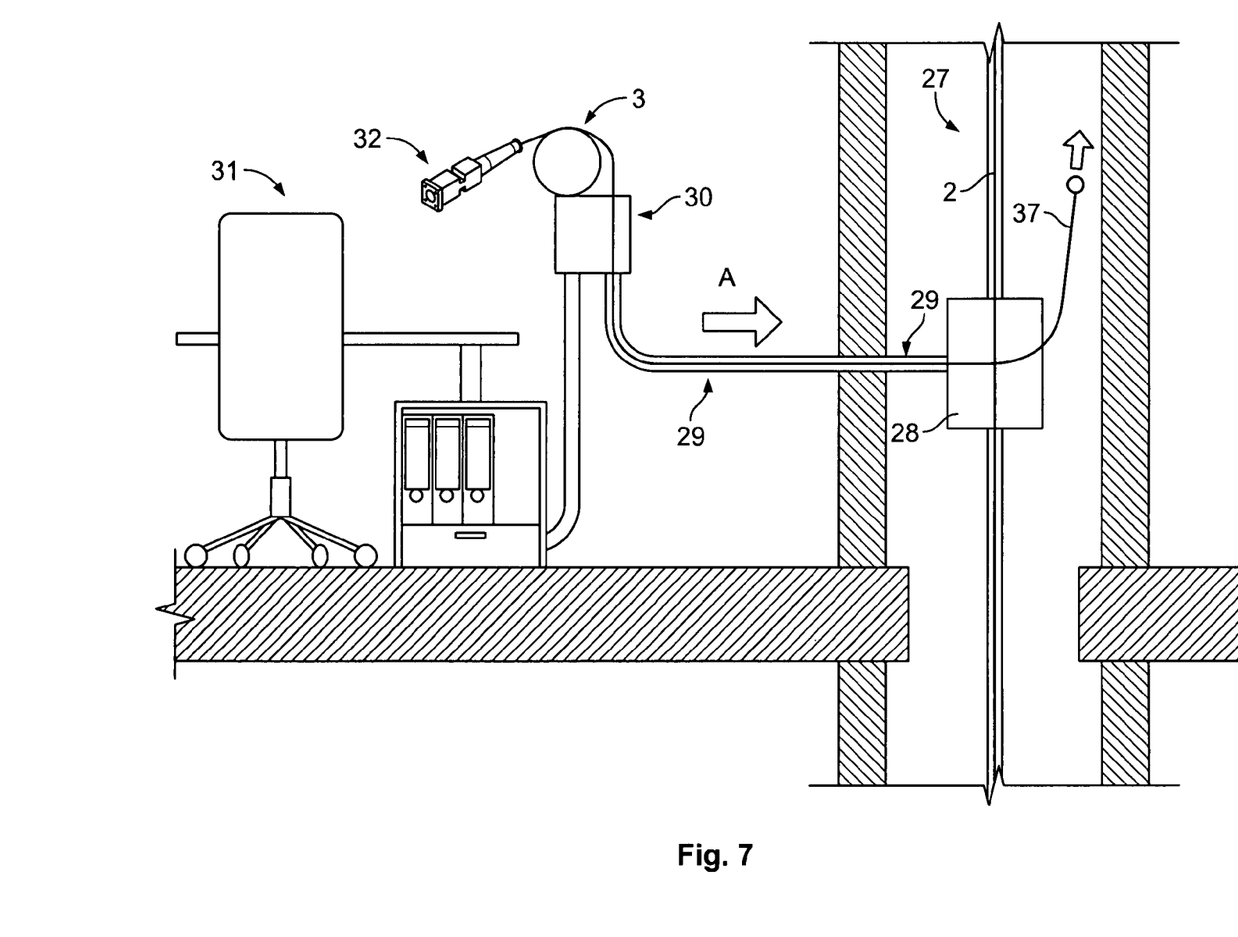
FIG. 7 illustrates a cress sectional view of a multi dwelling building cable.

FIG. 7 illustrates a schematical cross sectional view through a multi dwelling building having multiple dwelling units on each floor. The building has a central rise shaft 27 through which an optical cable 2 is passed from a basement to the last floor. FIG. 7 also shows a terminal box 28 providing access to the rise shaft 27 on each floor. Adjacent to the optical cable 2 providing access to the rise shaft 27. Terminating in said terminal box 28 is duct work 29 for a cable leading to an access point 30 provided within a single dwelling unit 31. The optical cable 3 passing through the rise shaft 27 can be any conventionally known optical cable. However, it is preferred to use an optical cable 3 which is flexible and houses plural optical fibers in a rather dense manner within a jacket such that each optical fiber can be pulled out from the jacket after partially removing the jacket, e.g. in the vicinity of the terminal box 28.

Figure 8:
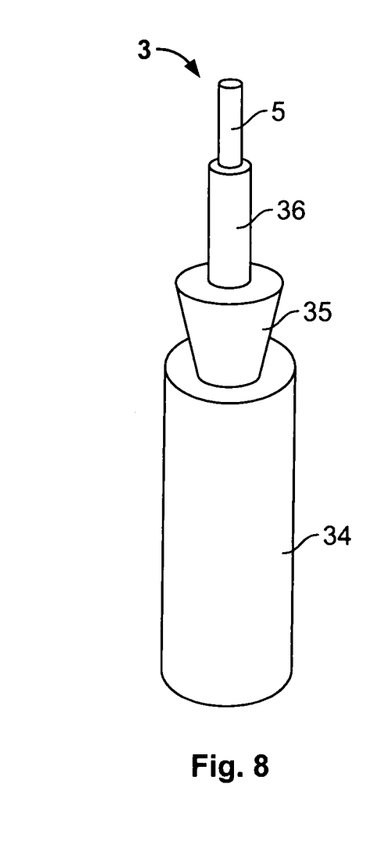
FIG. 8 illustrates the composition of a single fiber optical cable.

When providing access to the optical fiber cable 6 in a single dwelling unit within the multi dwelling unit, a preassembled optical cable depicted in FIG. 8 is used. This connecting optical fiber cable is identified with reference numeral 3 and is prepared as a preassembled cable having attached thereto a connector 32. The connector cable 3 is a very flexible cable having an outer surface provided by an outer jacket 34 of polyamide. Surrounded by said outer jacket 34 is an aramidic strength member 36 (Keflar™) which serves as a pull release insert within the connector cable 3. This strength member 36 surrounds an inner jacket 36 of thight acrilate housing and surrounding the optical fiber 5. With an outer diameter of the outer jacket 34 of 750 μm, this optical cable 3 is very flexible and slim and thus capable of being passed through duct work for a cable.

When connecting said connector cable 3 with the connector 32 to the central optical cable 2, the connector cable 3 is passed through the duct work 29 in the direction of arrow A. Passing can be achieved with a conventional pulling wire 37 used for dragging electrical wires through duct work 29. Accordingly, no splicing work is necessary within the dwelling unit 31. Instead, splicing is attained in the above described manner within the terminal box. In particular, the housing 16 with housing part 16a, 16b is used, the connector cable 3 is passed through tube 21 and the branched off fiber 4 is prepared as previously with respective FIG. 3. After splicing, the telescopic tubing will be expanded and the housing parts 16a, 16b will be connected.

1 protection device
2 provider cable
2a end portion (of 2)
3 connector cable
3a end portion (of 3)
3b inner stop
4 branching optical fiber
5 connecting optical fiber
6 cable jacket (of 2)
6a end (of 6)
7 cable jacket (of 3)
7a end (of 7)
7b stop (of 7)
8 splice
9 first tube
9a end (of 9)
9b stop (of 9)
9c second end (of 9)
9d second stop (of 9)
10 second tube
10a end (of 10)
10b second end (of 10)
10c stop (of 10)
11 branch point
11a window
12 tap-off device
12a seating portion
12b shell
12c receiving groove
12d longitudinal recess
12e bent section
12f rounded rim
13a-f fiber outlet ports
14 cone
14a securing rim
14b channel
14c lateral recess
15 adaptor sleeve
16 housing
16a first part
16b second part
16c central section
16d terminal section
16e terminal section
16f openings
17 chamber
18 splice holder
19 opening
20 tube duct
21 further tube
22 core section
22a contacting surface
23 cylindrical shell
23a tooth-like projection
23b tooth-like recess
24 end faces (of 16a)
25 end faces (of 16b)
27 rise shaft
28 terminal box
29 duct work for cable
30 access point
31 dwelling unit
32 connector
34 outer jacket
35 aramidic strength member/aramid strand
36 inner jacket
37 pulling wire
S fiber direction
A insertion direction of cable 3 in FIG. 7

The invention claimed is:

1. Splice protection device for spliced optical fibers, wherein the splice protection device comprises:
a first tube and a second tube, the second tube being arranged concentrically with respect to the first tube and having a common longitudinal axis, and the second tube being slidable within the first tube, after full assembly, the first and second tubes being adapted to receive therein at least one spliced fiber,
a branching optical fiber spliced with a connecting optical fiber by a splice, the first or the second tube is connected to a splice holder comprising a housing,
the housing having a first and a second opening, the first opening adapted to guide the a branching optical fiber into-the a central section of the housing, the second opening adapted to guide the a connecting optical fiber out of said central section of the housing, and the housing comprises:
a first part being connected to a further tube adapted to guide the connecting optical fiber, and
a second part being connected to the first or the second tube,
wherein the first and second part of the housing form partial cylindrical shells which form a continuous circumferential surface of the central section in their mounted position, and
wherein the first part and the second part of the housing are adapted to be connected to each other by form fit means holding the first part and the second part against each other in an interlocking manner.

2. Splice protection device according to claim 1, wherein the splice holder is adapted to tightly surround a splice between the branching optical fiber and the connecting fiber.

3. Splice protection device according to claim 1, wherein the connected first and second part of the housing are adapted to hold the splice by a form closure.

4. Splice protection device according to claim 1, wherein the first and second part of the housing partial cylindrical shells are complementary shells, which are arranged side by side in a direction normal to the fiber direction of the at least on spliced fiber thereby surrounding a chamber for the splice and the first and second part each have terminal sections of the housing, each of them providing a duct for receiving one of the tubes and/or the optical fiber.

5. Splice protection device according to claim 1, wherein the partial cylindrical shells are each projected by a truncated cone, which is adapted to receive one of the tubes and provides an end face for abutment of the splice received with the housing.

6. Splice protection device according to claim 1, wherein the first and second part of the housing each form a core section, said core sections being adapted to fit against each other thereby providing the chamber for the splice and fixed against each other by the form fit means which are effective to encompass the core sections in circumferential direction.

7. Splice protection device according to claim 6, wherein the core sections of the first and second part form an essentially continuous cylindrical core of the housing, and the partial cylindrical shell of at least one part partially projects the core section of the at least one part while the partial cylindrical shell of the other of said parts exposes the core section of the other of said parts such that the partial cylindrical shell of the at least one parts snaps around the core section of the other of said parts where the core section of the other of said parts is exposed.

8. Splice protection device according to claim 1, wherein the splice forms outer circumferential holding sections and the partial cylindrical shells are adapted to snap around the holding sections.

9. Splice protection device according to claim 1, wherein one of said tubes is connected to an adaptor sleeve.

10. Fiber optic cable assembly, comprising:
a splice protection device according to claim 9,
a tap-off device having a seating portion for a provider cable and a fiber outlet port for said branching optical fiber,
wherein said adaptor sleeve is adapted to be plugged onto the fiber outlet port and being connected to one of said first or second tubes, and
wherein the other of said first or second tubes being connected to the splice holder.

* * * * *